United States Patent
Nishida et al.

(10) Patent No.: US 6,893,765 B1
(45) Date of Patent: May 17, 2005

(54) POLYMER ELECTROLYTE FUEL CELL

(75) Inventors: Kazufumi Nishida, Moriguchi (JP); Junji Niikura, Hirakata (JP); Hisaaki Gyoten, Shijonawate (JP); Kazuhito Hatoh, Osaka (JP); Hideo Ohara, Katano (JP); Teruhisa Kanbara, Toyonaka (JP); Satoru Fujii, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 426 days.

(21) Appl. No.: 10/088,110

(22) PCT Filed: Sep. 6, 2000

(86) PCT No.: PCT/JP00/06073

§ 371 (c)(1),
(2), (4) Date: Mar. 15, 2002

(87) PCT Pub. No.: WO01/22513

PCT Pub. Date: Mar. 29, 2001

(30) Foreign Application Priority Data

Sep. 17, 1999 (JP) .......................................... 11/262970
Oct. 20, 1999 (JP) .......................................... 11/298926

(51) Int. Cl.[7] .......................... H01M 2/00; H01M 2/02; H01M 2/14
(52) U.S. Cl. .............................. 429/34; 429/38; 429/39
(58) Field of Search ............................. 429/34, 35, 38, 429/39

(56) References Cited

U.S. PATENT DOCUMENTS

| | | | | |
|---|---|---|---|---|
| 4,794,055 A | * | 12/1988 | Matsumura et al. | 429/35 |
| 5,776,624 A | * | 7/1998 | Neutzler | 429/26 |
| 6,051,331 A | * | 4/2000 | Spear et al. | 429/34 |
| 6,090,228 A | * | 7/2000 | Hwang et al. | 148/518 |

FOREIGN PATENT DOCUMENTS

| | | |
|---|---|---|
| JP | 5-25635 | 2/1993 |
| JP | 5-25636 | 2/1993 |
| JP | 8-311651 | 11/1996 |
| JP | 9-298064 | 11/1997 |
| JP | 10-55813 | 2/1998 |
| JP | 10-237643 | 9/1998 |
| JP | 11-162479 | 6/1999 |
| JP | 11-219713 | 8/1999 |
| JP | 2000-323151 | 11/2000 |

* cited by examiner

Primary Examiner—Patrick Joseph Ryan
Assistant Examiner—Julian Mercado
(74) Attorney, Agent, or Firm—McDermott Will & Emery LLP

(57) ABSTRACT

A polymer electrolyte fuel cell comprises a separator plate having a gas channel for supplying an oxidant gas or a fuel gas to an electrode, said separator plate comprising a metal plate, a conductive film formed on the surface of the metal plate, and a diffused layer resulting from diffusion of a material of the conductive film formed between the metal plate and the conductive film. The fuel cell produces stable output free from corrosion or dissolution of the metal plate even in a long-term operation.

11 Claims, 6 Drawing Sheets a)

b)

c)

d)

c)

a)

b)

US 6,893,765 B1

POLYMER ELECTROLYTE FUEL CELL

TECHNICAL FIELD

The present invention relates to a solid polymer electrolyte fuel cell used for portable power sources, electric vehicle power sources, domestic cogeneration systems, etc., and more particularly to an improvement of its conductive separator plate.

BACKGROUND ART

A fuel cell using a solid polymer electrolyte generates electric power and heat simultaneously by electrochemically reacting a fuel gas containing hydrogen with an oxidant gas containing oxygen such as air. This fuel cell is basically composed of a polymer electrolyte membrane that selectively transports hydrogen ions, and a pair of electrodes, namely, an anode and a cathode, formed on both surfaces of the polymer electrolyte membrane. The above-mentioned electrode usually comprises a catalyst layer which is composed mainly of a carbon powder carrying a platinum group metal catalyst and formed on the surface of the polymer electrolyte membrane; and a diffusion layer which has both gas permeability and electronic conductivity and is formed on the outside surface of this catalyst layer.

Moreover, in order to prevent leakage of the fuel gas and oxidant gas supplied to the electrodes and prevent mixing of the two kinds of gases, gas sealing materials or gaskets are provided on the periphery of the electrodes with the polymer electrolyte membrane therebetween. These sealing materials and gaskets are assembled into a single part together with the electrodes and polymer electrolyte membrane in advance. This part is called "MEA" (electrolyte membrane and electrode assembly). Disposed outside of the MEA are conductive separator plates for mechanically securing the MEA and for electrically connecting adjacent MEAs in series or in parallel in some occasion. A portion of the separator plates, which is in contact with the MEA, is provided with a gas channel for supplying a reacting gas to the electrode surface and for removing a generated gas and excess gas. It is possible to provide the gas channels separately from the separator plates, but grooves are usually formed in a surface of the separator plate to serve as the gas channels.

In order to supply the fuel gas and oxidant gas to these grooves, it is necessary to branch pipes that supply the fuel gas and the oxidant gas, respectively, according to the number of separator plates to be used and to use piping jigs for connecting an end of the branch directly to the groove of the separator plate. This jig is called "manifold", and a type of manifold that directly connects the supply pipes of the fuel gas and oxidant gas to the grooves as mentioned above is called "external manifold". There is a type of manifold, called "internal manifold", with a more simple structure. The internal manifold is configured such that through holes are formed in the separator plates having gas channels and the inlet and outlet of the gas channels are extended to the holes so as to supply the fuel gas and oxidant gas directly from the holes.

Since the fuel cell generates heat during operation, it is necessary to cool the cell with cooling water or the like in order to keep the cell in a good temperature condition. In general, a cooling section for feeding the cooling water is provided for every one to three cells. There are a type in which the cooling section is inserted between the separator plates and a type in which a cooling water channel is provided in the rear surface of the separator plate so as to serve as the cooling section, and the latter type is often used. The structure of a common cell stack is obtained by placing these MEAs, separator plates and cooling sections one upon another to form a stack of 10 to 200 cells, sandwiching this stack by end plates with a current collector plate and an insulating plate between the stack and each end plate and securing them with clamping bolts from both sides.

In such a polymer electrolyte fuel cell, the separator plates need to have a high conductivity, high air-tightness for the fuel gas and oxidant gas, and high corrosion resistance against a reaction of hydrogen/oxygen oxidation-reduction. For such reasons, a conventional separator plate is usually formed of carbon material such as glassy carbon and expanded graphite, and the gas channel is produced by cutting a surface of the separator plate, or by molding with a mold when the expanded graphite is used.

With a conventional method employing the cutting of a carbon plate, it was difficult to reduce the cost of the material of the carbon plate and the cost of cutting the carbon plate. Besides, a method using expanded graphite also suffered from a high cost of material, and it has been considered that the high cost of material prevents a practical application of this method.

In recent years, attempts to use a metal plate, such as stainless steel, in place of the conventionally used carbon material have been made.

However, in the above-mentioned method using a metal plate, since the metal plate is exposed to an acidic atmosphere of the pH of around 2 to 3 at high temperatures, the corrosion and dissolution of the metal plate will occur when used in a long time. The corrosion of the metal plate increases the electric resistance in the corroded portion and decreases the output of the cell. Moreover, when the metal plate is dissolved, the dissolved metal ions diffuse in the polymer electrolyte membrane and trapped at the ion exchange site of the polymer electrolyte membrane, resulting in a lowering of the ionic conductivity of the polymer electrolyte itself. For these causes, when a cell using a metal plate as it is for a separator plate was operated for a long time, a problem arises that the power generating efficiency is gradually lowered.

It is an object of the present invention to improve a separator plate for use in fuel cells and provide a separator plate which is composed of a metal material that can be easily processed, restrained from corrosion and dissolution to maintain chemical inactivity even when its surface to be exposed to a gas is exposed to an acidic atmosphere, and has good conductivity.

DISCLOSURE OF INVENTION

A polymer electrolyte fuel cell of the present invention comprises: a polymer electrolyte membrane; an anode and a cathode sandwiching the polymer electrolyte membrane therebetween; an anode-side conductive separator plate having a gas channel for supplying a fuel gas to the anode; and a cathode-side conductive separator plate having a gas channel for supplying an oxidant gas to the cathode, and is characterized in that each of the anode-side and cathode-side conductive separator plates comprises a metal and an oxidation resistant conductive film coating a surface of the metal facing the anode or cathode with a specific intermediate layer between the surface and the conductive film.

BEST MODE FOR CARRYING OUT THE INVENTION

Figure 1:
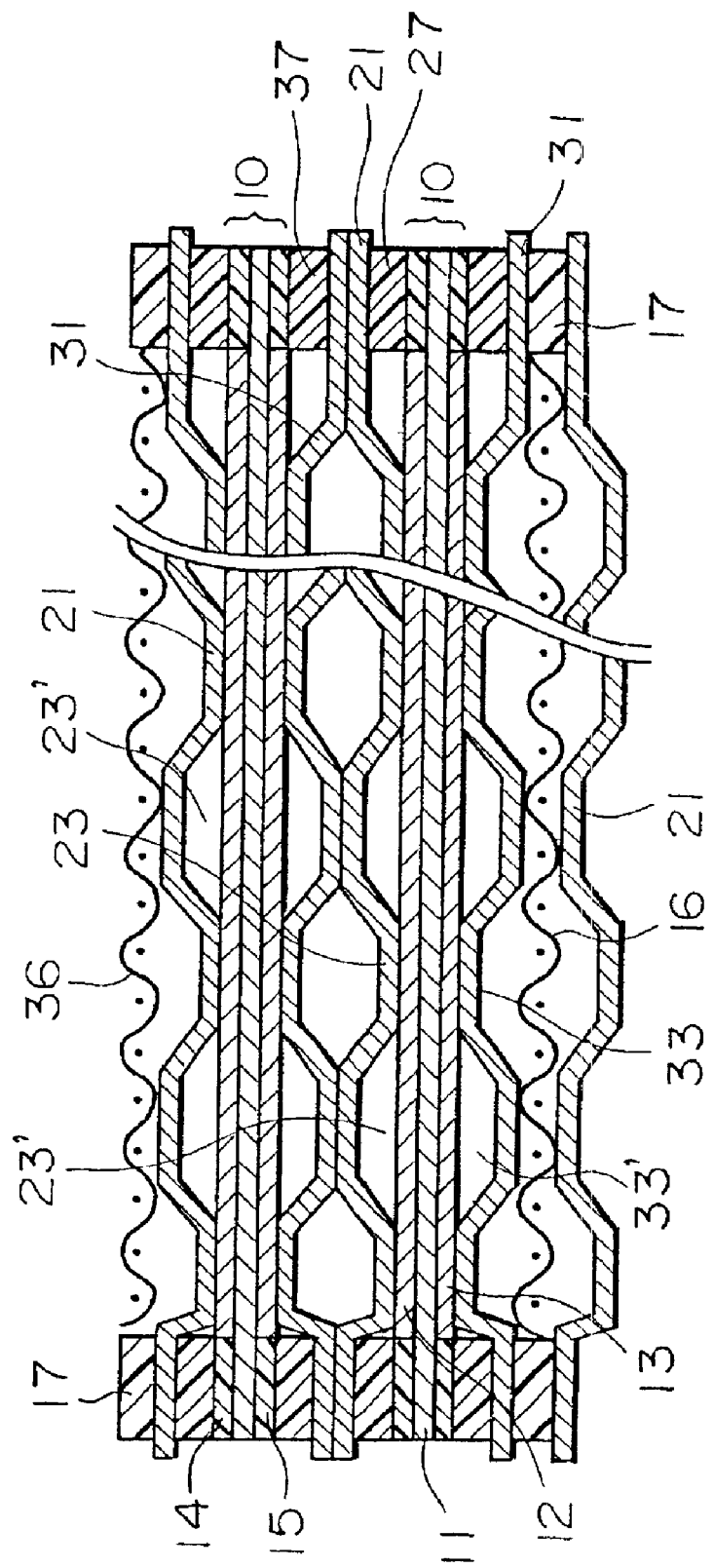
FIG. 1 is a cross sectional view depicting essential sections of a fuel cell according to an example of the present invention.

A separator plate of the present invention is basically composed of a metal plate whose surface is coated with an oxidation-resistant conductive film with a specific intermediate layer between the surface and the conductive film. Further, this metal plate is provided with ribs or grooves for forming a gas channel by a process such as press working.

A preferred separator plate of the present invention is composed of a combination of the above-mentioned processed metal plate, which has ribs or grooves for guiding a fuel gas or an oxidant gas on a surface facing the electrode, and an insulating sheet that has elasticity and functions as a gasket. The insulating sheet forms the gas channel for guiding the fuel gas or the oxidant gas from the supply side to the discharge side in cooperation with the ribs or grooves of the metal plate, and also functions as a gasket for preventing leakage of the fuel gas or oxidant gas out of the gas channel.

As the metal plate on which the conductive film is formed, it is possible to use a metal plate such as stainless steel and aluminum, which has excellent conductivity and allows easy formation of ribs or grooves serving as the gas channel by a process such as press working.

In a preferred mode, the oxidation-resistant conductive film covering the surface of the metal plate is composed of noble metal such as Au, Pt, Rh and Pd. In another preferred mode, the conductive film is composed of an interstitial compound (or a so-called interstitial alloy) obtained by doping at least one kind of nonmetal selected from the group consisting of hydrogen, nitrogen, carbon and boron in a transition metal. Among interstitial compounds, nitrides such as TiN, ZrN, TiAlN, TiZrN, TaN, WN, and CrN; and carbides such as TiC, ZrC, WC, and TaC are particularly preferred. In the case of such a conductive film, the intermediate layer formed at the interface between the conductive film and the metal plate is a diffused layer resulting from diffusion of the conductive film material into the metal plate.

In order to form the film composed of the above-mentioned noble metal, it is preferable to use rf sputtering. However, it is also possible to form the film by chemical evaporation, plating or other method. As the method of forming the conductive film composed of nitride mentioned above, sputtering under an atmosphere containing a nitrogen gas with the use of a metal that forms the nitride is preferred, while, as the method of forming the conductive film composed of carbide mentioned above, sputtering using the carbide as the target is preferred. In order to form the diffused layer after the formation of such a conductive film, it is preferred to perform a heat treatment at 250 to 400° C. for 5 minutes to 2 hours under a non-oxidizing atmosphere, more specifically the atmosphere of argon, nitrogen or vacuum (0.1 Pa or less).

In another mode, the conductive film and the diffused layer cover the surface of the metal plate in an island pattern. In this case, it is preferred to form a corrosion-resistant film in a portion of the metal plate where the conductive film is not formed. The area of each island-like coated portion is at least 50 angstrom×50 angstrom, and the percentage of the total coated portions is preferably 30% or more in the area ratio.

In another preferred mode, the oxidation-resistant conductive film covering the surface of the metal plate is a compound as exemplified above and composed of a nitride or carbide of an element selected from the group consisting of Ti, Cr, Zr, Al, Ta, and W. In the case of such a conductive film, the intermediate layer formed at the interface between the conductive film and the metal plate is composed of a metal element that forms the conductive compound film. In order to form such a conductive compound film, first, the intermediate layer made of the metal element that forms the conductive compound is formed on the surface of the metal plate, and then the conductive compound film is formed on the intermediate layer. This intermediate layer improves the adhesion between the metal substrate and the conductive film, and can also prevent pinholes. As the method of forming such an intermediate layer and conductive compound film, rf sputtering as mentioned above is preferred. In addition, if an inclination is provided in the percentage content of the metal element in the conductive film so that the percentage content decreases from the interface between the conductive film and intermediate layer toward the direction of the surface of the conductive film, it is possible to improve the adhesion between the metal separator plate and the conducive film, relax the residual stress on the film, and further prevent pinholes. As the method of controlling the percentage content of the metal atom in the conductive film composed of nitride, as shown in later-described examples, it is preferred to use a method that controls the flow ratio of nitrogen in the sputtering gas or a method that controls the rf power in producing the nitride of metal by sputtering the metal under an atmosphere containing nitrogen. Further, as the method of controlling the percentage content of the metal atom in the conductive film composed of carbide, a method that controls a reaction gas in producing the metal carbide by an organic metal CVD method is used.

The corrosion resistance of the metal having the intermediate layer and conductive compound film formed as described above is improved by further applying a heat treatment. Preferred heat-treatment conditions are applying a heat treatment at 200 to 500° C., more preferably 250 to 400° C., for 30 minutes to 2 hours under a non-oxidizing atmosphere, more specifically the atmosphere of argon, nitrogen or vacuum (0.1 Pa or less). By this heat treatment, a diffused layer resulting from diffusion of the metal element of the intermediate layer into the metal substrate is formed.

Next, referring to FIG. 1 through FIG. 5, the following description will explain examples of the structure of a fuel cell according to the present invention. The structural drawings used here are intended to facilitate understanding, and the relative sizes and positional relations of the respective elements are not necessarily exact.

Figure 2:
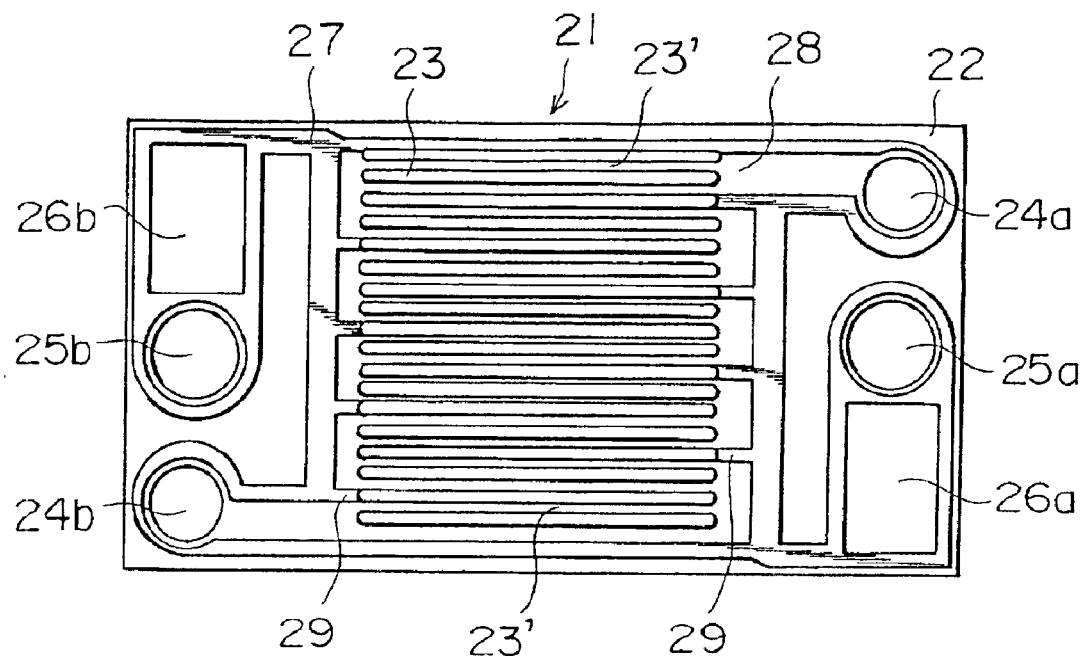
FIG. 2 is a plan view of an anode-side separator plate of the fuel cell.
Figure 3:
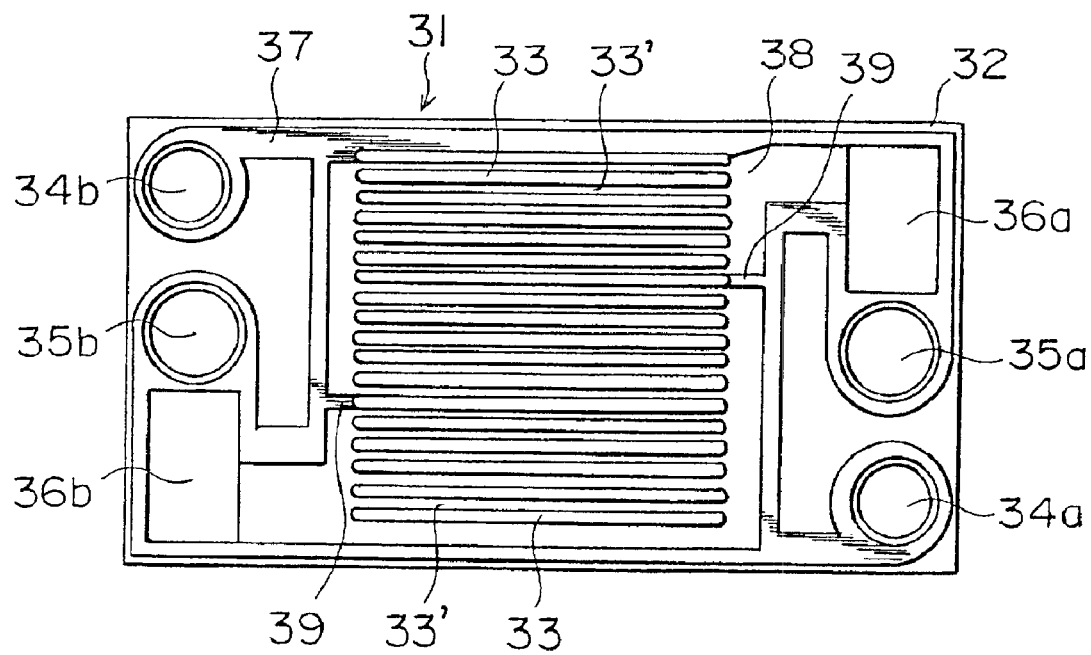
FIG. 3 is a plan view of a cathode-side separator plate of the fuel cell.

FIG. 1 is a cross sectional view depicting essential sections of a fuel cell stack, FIG. 2 is a plan view of its anode-side separator plate, and FIG. 3 is a plan view of its cathode-side separator plate.

10 represents an electrolyte membrane and electrode assembly (hereinafter referred to as "MEA") composed of a solid electrolyte membrane 11, an anode 12 and a cathode 13 bonded to both surfaces of the solid electrolyte membrane 11, gaskets 14 and 15 arranged on the peripheral portions thereof, etc. An anode-side separator plate 21 and a cathode-side separator plate 31 are disposed on the outside of the MEA. The MEA 10 and the separator plates 21 and 31 constitute a unit cell, and a plurality of such unit cells are stacked so that they are connected in series. In this example, a conductive metal mesh 16 and a gasket 17 are inserted between the separator plates 21 and 31 of every two cells so as to form a cooling section for passing cooling water.

Figure 4:
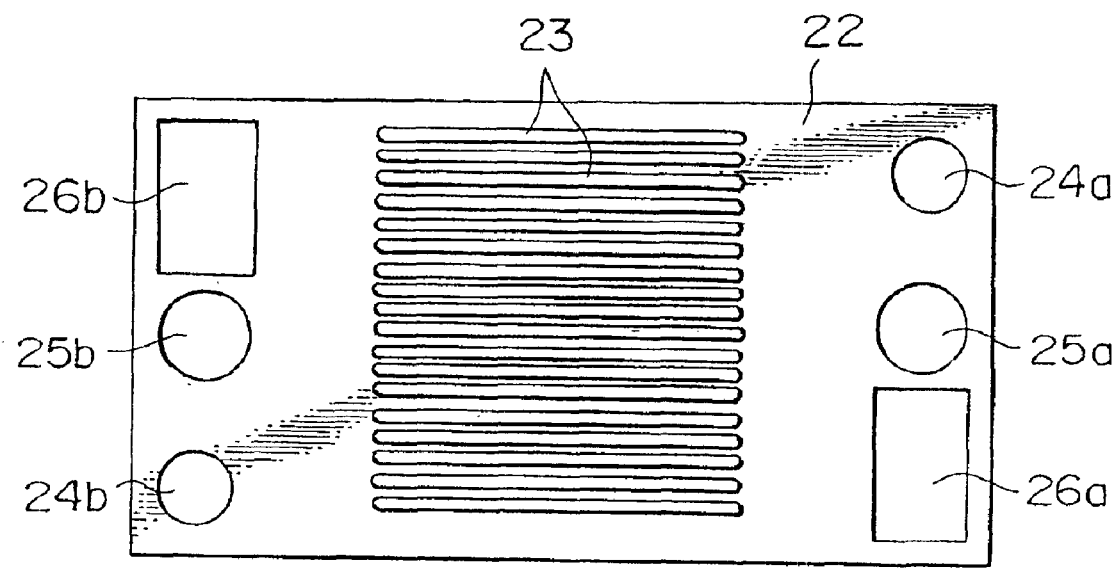
FIG. 4 is a plan view of a metal plate constituting the anode-side separator plate.
Figure 5:
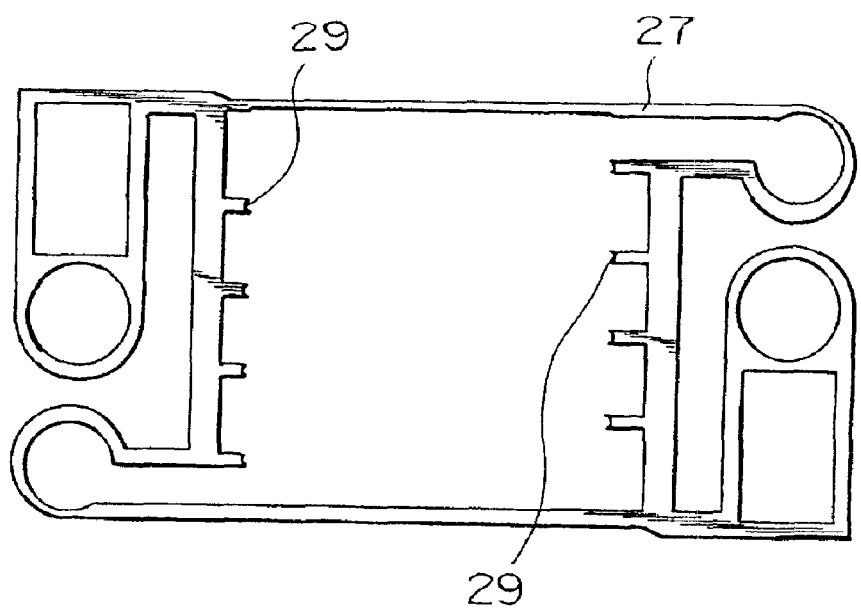
FIG. 5 is a plan view of an insulating sheet constituting the anode-side separator plate.

The anode-side separator plate 21 is constructed by sticking a metal plate 22 shown in FIG. 4 and an insulating sheet 27 shown in FIG. 5 together. The metal plate 22 has an array of protruding ribs 23 formed at the center of one major surface facing the anode by press working, and fluid inlet openings 24a, 25a, 26a and fluid outlet openings 24b, 25b, 26b on the right and left. Meanwhile, when the insulating sheet 27 fabricated by stamping a sheet is stuck to a surface of the metal plate 22 having the ribs 23, a groove 28 is formed for guiding a fluid, i.e., a fuel gas, from the fluid inlet opening 24a to the fluid outlet opening 24b, and, when the insulating sheet 27 is closely attached to the anode, it functions as a gasket for preventing the fuel gas from leaking out of the groove 28 and for preventing the fluid passing through the openings 25a, 25b and openings 26a, 26b from leaking out.

The groove 28 formed on the surface of the separator plate 21, by the assemblage of the ribs 23 of the metal plate 22 and rib pieces 29 of the sheet 27, cooperates with two grooves 23' formed on both sides of the ribs 23 to pass the fuel gas.

As shown in FIG. 3, the cathode-side separator plate 31 is composed of a metal plate 32 having an array of protruding ribs 33 formed at the center of one major surface facing the cathode by press working and fluid inlet openings 34a, 35a, 36a and fluid outlet openings 34b, 35b, 36b on the right and left; and an insulating sheet 37 stuck to the surface having the ribs 33. Formed on the surface of this cathode-side separator plate 31 facing the cathode is a groove 38 for guiding a fluid, i.e., an oxidant gas from the fluid inlet opening 36a to the fluid outlet opening 36b. Besides, the sheet 37 functions as a gasket for preventing the oxidant gas from leaking out of the groove 38 and for preventing the fluid passing through the openings 34a, 35a and openings 34b, 35b from leaking out.

The groove 38, by the assemblage of the ribs 33 of the metal plate 32 and rib pieces 39 of the sheet 37, cooperates with four grooves 33' formed between the ribs 33 to pass the oxidant gas.

Thus, when the separator plate is comprised of a combination of the metal plate having a plurality of ribs formed by press working and the insulating sheet stamped, it is possible to change the size of the fluid passage groove by only changing the shape of the insulating sheet.

In the above-mentioned example, the cross-sectional area of the channel formed between the ribs 33 as a gas channel running to the groove 38 of the cathode-side separator plate 31 is three times larger than the cross-sectional area of the channel formed between the ribs 23 as a gas channel running to the groove 28 of the anode-side separator plate 21. It is therefore possible to make the flow rate of the oxidant gas greater than that of the fuel gas.

In the above-mentioned example, while each of the anode-side conductive separator plate and the cathode-side separator plate is independently fabricated, it is also possible to construct the anode-side conductive separator plate and the cathode-side separator plate as one piece of separator plate so that one of the surfaces is an anode-side conductive separator plate and the other surface is a cathode-side conductive separator plate.

The following description will explain examples of the present invention with reference to the drawings.

EXAMPLE 1

An electrode catalyst carrying platinum particles with an average particle diameter of about 30 angstroms on an acetylene black was prepared. The weight ratio of carbon to platinum in this electrode catalyst was 3:1. A dispersion of a perfluorocarbon sulfonic acid powder in an ethyl alcohol was mixed with a dispersion of this catalyst powder in isopropanaol to form a paste. This paste was printed on one of the surfaces of a 250 μm thick carbon nonwoven fabric by screen printing to form an electrode catalyst layer. The catalyst layer was formed so that the amounts of platinum and perfluorocarbon sulfonic acid contained were 0.5 mg/cm$^2$ and 1.2 mg/cm$^2$, respectively. By forming the catalyst layer on the carbon nonwoven fabric in this manner, an anode and a cathode having the same structure were fabricated.

An electrolyte membrane and electrode assembly (MEA) was fabricated by bonding these electrodes to both surfaces of the center part of a proton conductive polymer electrolyte membrane having an area slightly larger than the electrode by hot pressing so that the catalyst layer was in contact with the electrolyte membrane. The proton conductive polymer electrolyte used here was a 25 μm-thick thin film of perfluorocarbon sulfonic acid represented by the formula shown below, where x=1, y=2, m=5 to 13.5, and n≈1000. Further, the perfluorocarbon sulfonic acid mixed with the catalyst layer was the same compound as the above-mentioned electrolyte membrane.

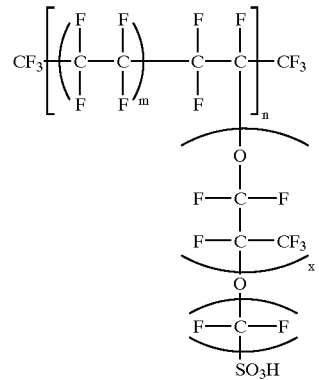

Next, a process of fabricating the conductive separator plate will be explained. As shown in FIG. 3, the ribs 23 with a width of about 2.8 mm and a height of about 1 mm were formed at a pitch of 5.6 mm in a 10 cm×9 cm area at the center of a 0.3 mm thick stainless steel SUS316 plate by press working. Thereafter, Au was formed in a thickness of 0.2 μm on the surface of this plate by rf magnetron sputtering. The film forming conditions were an argon atmosphere, a rf power of 300 W, a film forming time of 15 minutes, and a substrate temperature of 200° C. Note that, before the film forming, the substrate was cleaned by reverse sputtering so as to remove a naturally oxidized film on its surface (this is also performed in later-described examples).

Conductive films made of various kinds of noble metals, nitrides and carbides were formed in the same manner. The film forming conditions of these conductive films are respectively shown in Table 1, Table 2 and Table 3.

TABLE 1

| Conductive film material | Target | Film thickness (μm) | Resistivity (μΩ · cm) |
|---|---|---|---|
| Au | Au | 0.2 | 2.6 |
| Pt | Pt | 0.25 | 12 |
| Rh | Rh | 0.2 | 14 |
| Pd | Pd | 0.25 | 7.2 |

Film Forming Conditions
 Substrate temperature: 200° C., Ar=20 sccm
 Plasma power: 300 W, Film forming time: 15 min.

TABLE 2

| Conductive film material | Target | Film thickness (μm) | Resistivity (μΩ · cm) |
|---|---|---|---|
| TiN | Ti | 0.4 | 20–200 |
| ZrN | Zr | 0.4 | 10–150 |
| TiAlN | Ti + Al | 0.4 | 100–1000 |
| TiZrN | Ti + Zr | 0.4 | 50–800 |
| TaN | Ta | 0.35 | 200–2000 |
| WN | W | 0.35 | 400–10000 |
| CrN | Cr | 0.45 | 3000–10000 |

Film Forming Conditions
 Substrate temperature: 200° C., Ar/N$_2$=12/8 sccm
 Plasma power: 200 W, Film forming time: 30 min.

TABLE 3

| Conductive film material | Target | Film thickness (μm) | Resistivity (μΩ · cm) |
|---|---|---|---|
| TiC | TiC | 0.3 | 40–400 |
| ZrC | ZrC | 0.3 | 40–400 |
| WC | WC | 0.25 | 20–400 |
| TaC | TaC | 0.25 | 15–200 |

Film Forming Conditions
 Substrate temperature: 200° C., Ar=20 sccm
 Plasma power: 200 W, Film forming time: 30 min.

Subsequently, by heat-treating the conductive separator plate on which the conductive film was formed, a diffused layer resulting from diffusion of the conductive film material into the metal substrate was formed. The heat treatment was performed at a heating temperature of 300° C. for one hour under a vacuum atmosphere (0.1 Pa or less). After the heat treatment, the resistivity increased by around 5 to 20%, but there was no significant effect on the characteristics of the fuel cell. However, with the formation of the diffused layer between the conductive film and the separator plate, there was a significant improvement of the chemical resistance. Actually, a sample that was prepared by forming only the conductive film on the stainless steel SUS substrate and the same stainless substrate on which the conductive film and the diffused layer were formed were immersed in a 0.01 N sulfuric acid at 80° C. for 500 hours, and, as the results of visual observation of the corrosion state, corrosion which would be attributable to pinholes in the film was recognized in the sample in which only the conductive film was formed. On the other hand, corrosion was not recognized in the sample having the diffused layer. It can be understood from the above that it is possible to improve a chemical resistance to the diffused layer itself and reduce pinholes in the conductive film by the formation of the diffused layer.

The fluid inlet openings 24a, 25a, 26a and fluid outlet openings 24b, 25b, 26b were formed in the metal substrate 22 made of the stainless steel on which the conductive film was formed as described above and the diffused layer was formed by the heat treatment. Next, the anode-side separator plate 21 was fabricated by sticking the insulating sheet 27 made of a phenol resin with a thickness of about 1 mm shown in FIG. 5 to a surface of the metal substrate on which the conductive film was formed. Similarly, the fluid inlet openings 34a, 35a, 36a and fluid outlet openings 34b, 35b, 36b were formed in the metal substrate 32 treated in the same manner, and the cathode-side separator plate 31 was fabricated by sticking the insulating sheet 37 made of a phenol resin with a thickness of about 1 mm to a surface on which the conductive film was formed.

These separator plates were combined with the above-mentioned MEAs to stack 50 cells, and the resulting cell stack was clamped via current collector plates and insulating plates by stainless steel end plates and clamping rods with a pressure of 20 kgf/cm$^2$. If the clamping pressure is too small, a gas leakage occurs and the contact resistance between the conductive members increases, and therefore the cell performance is degraded. On the other hand, if the clamping pressure is to large, the electrodes are broken or the separator plates are deformed, and thus it is necessary to change the clamping pressure according to the design of the gas flow grooves.

As comparative examples, a fuel cell using separator plates on which a conductive film was formed of Au, but no diffused layer was formed, was prepared as comparative Example 1; and a fuel cell using separator plates made of stainless steel SUS316 plates to which a surface treatment was not applied was prepared as Comparative Example 2.

Each of the fuel cell of this example using a separator plate on which the conductive film was formed of Au and further the diffused layer was formed and the fuel cells of Comparative Example 1 and Comparative Example 2 was held at 85° C., and a hydrogen gas which was humidified and heated to a dew point of 83° C. was supplied to the anode, while the air which was humidified and heated to a dew point of 78° C. was supplied to the cathode. As a result, an open circuit voltage of 50 V was exhibited in a no-load condition in which a current was not output.

Figure 6:
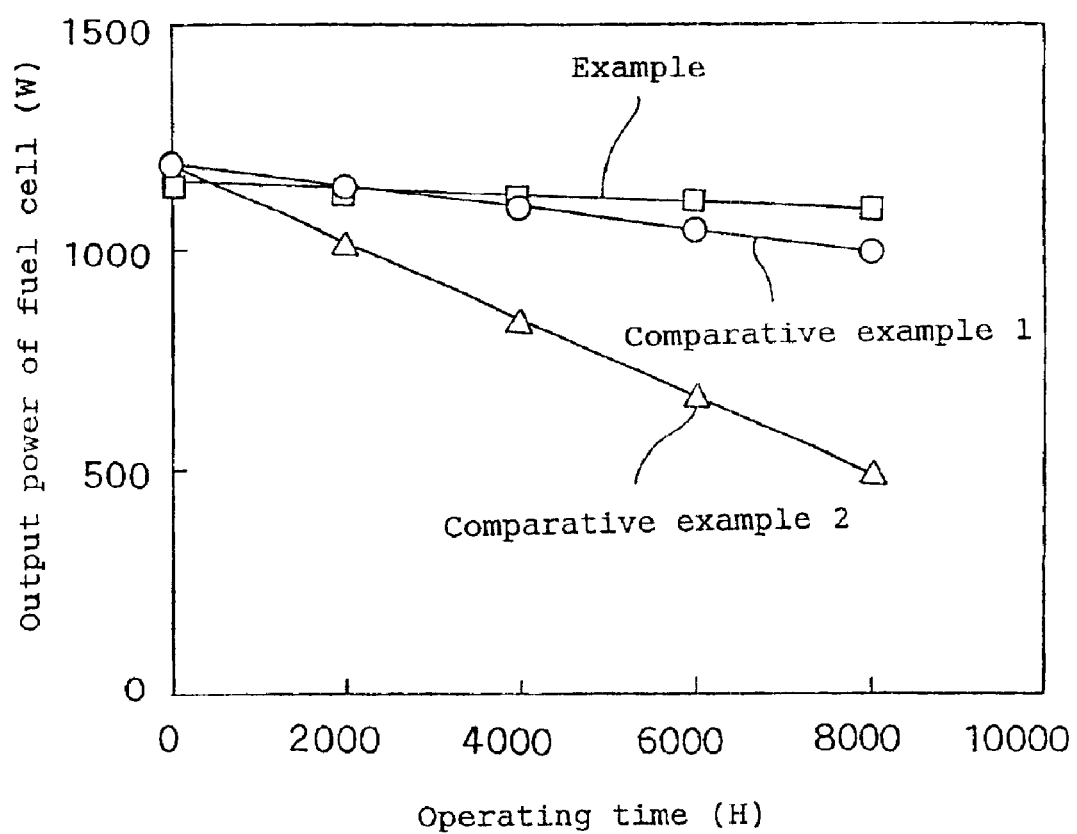
FIG. 6 is a drawing showing the output characteristics of fuel cells of an example of the present invention and a comparative example.

These cells were subjected to the continuous power generation test under the conditions of the fuel utilization ratio of 80%, the oxygen utilization ratio of 40% and the current density of 0.5 A/cm$^2$, and the changes of their output characteristics with time are shown in FIG. 6. As a result, the output of the cell of Comparative Example 2 was lowered with the passage of time, while the cells of Comparative Example 1 and Example 1 kept the cell output of about 1000 W (22 V–45 A) over 8000 hours. In the cell of Example 1, since the diffused layer was formed between the metal substrate of the separator plate and the conductive film, the amount of the output decrease in a long operating time was reduced. The output of the cell of this example was larger than the output of the cell of Comparative Example 1 after the operating time of 3000 hours. The reason for this would be that the corrosion resistance of the metal substrate of the separator plate was improved by the formation of the diffused layer.

Under the same operating conditions as above, cells using metal separator plates having other conductive films were examined for the cell outputs at an initial stage (10 hours later from the start of operation) and upon passage of 8000 hours of the operating time. The results are shown in Table 4.

TABLE 4

| Conductive film | Output (W) | |
| --- | --- | --- |
| | Initial stage | 8000 hours later |
| Pt | 1170 | 1130 |
| Rh | 1170 | 1120 |
| Pd | 1190 | 1150 |
| TiN | 1200 | 1150 |
| ZrN | 1220 | 1170 |
| TaN | 1100 | 1030 |
| TiAlN | 1160 | 1080 |
| TiC | 1170 | 1100 |
| ZrC | 1180 | 1120 |
| WC | 1210 | 1160 |
| TaC | 1190 | 1140 |

While this example illustrated a plurality of gas flow grooves which are parallel and straight, it is also possible to make various modifications, such as the formation of a plurality of curved portions in the midway of the gas flow grooves running from the gas inlet openings to the gas outlet openings and a structure where a center manifold aperture and an outer manifold aperture are connected with a spiral gas flow groove like the shell of a snail.

Moreover, in this example, while SUS316 was used as the metal substrate of the separator plate, it is also possible to use other stainless steel, Al, Ti, etc.

EXAMPLE 2

Figure 7:
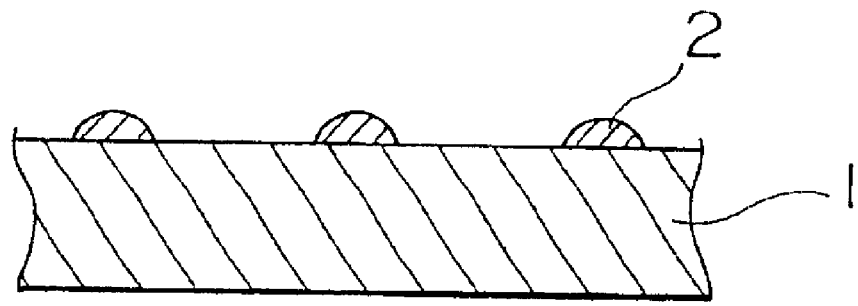
FIG. 7 is a cross sectional view showing the process of surface-treating a metal substrate of a separator plate according to another example of the present invention.
Figure 7:
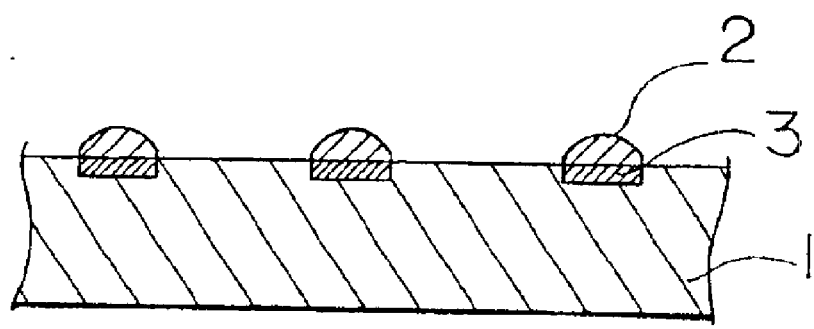
Figure 7:
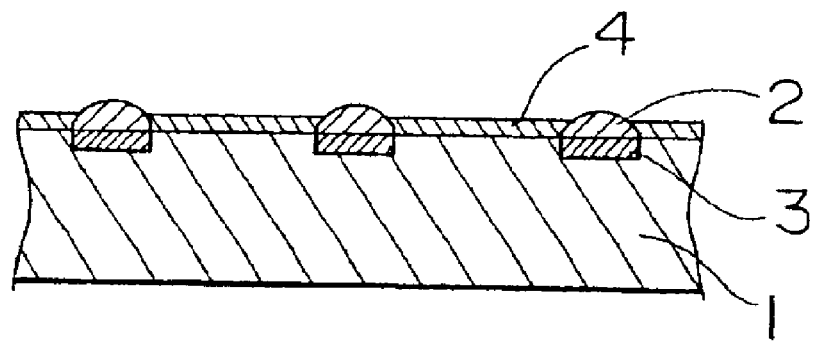

In this example, the conductive film was formed in an island pattern on the metal substrate of the separator plate. FIG. 7 shows the cross section in the process of forming the island-like conductive film. The island-like conductive film 2 was formed on the metal substrate 1 (a in FIG. 7) under the same conditions as in Example 1 except that the film forming time was 2 to 6 minutes. Subsequently, a diffused layer 3 was formed below the island-like conductive film 2 (b in FIG. 7). In other words, the heat treatment was performed under the conditions of the heating temperature of 300° C. and the treatment time of 20 minutes, under a vacuum atmosphere (0.1 Pa or less). The area of each island-like conductive film 2 was 0.04 mm$^2$, and the percentage of all of them was 50% in the area ratio. The conductive film 2 can be used as the separator plate even in the state shown in (b) of FIG. 7. However, a further heat treatment was performed at 250° C. for about 1 hour in the air. As a result, a corrosion-resistant film 4 made of a metal oxide grew in a portion that was not coated with the island-like conductive film. For example, when Al is used as the metal substrate, an aluminum oxide film will grow as the corrosion-resistant film, while, when Ti is used as the metal substrate, a titanium oxide film will grow as the corrosion-resistant film. Besides, when stainless steel is used as the metal substrate, a chromium oxide film will grow as the corrosion-resistant film by applying a chemical treatment using nitric acid, etc. The chemical resistance of the metal substrate of the separator plate is significantly improved by these corrosion-resistant films.

Fuel cells similar to those of Example 1 were assembled using the metal substrates which were surface-treated as described above in the separator plates; and, like Example 1, each of the fuel cells was held at 85° C., and a hydrogen gas which was humidified and heated to a dew point of 83° C. was supplied to the anode and the air which was humidified and heated to a dew point of 78° C. was supplied to the cathode so as to carry out the continues power generation tests under the conditions of the fuel utilization ratio of 80%, the oxygen utilization ratio of 40% and the current density of 0.5 A/cm$^2$. Table 5 shows the relationship among the types of the metal substrate, conductive film and corrosion-resistant film and the cell outputs at the initial stage (10 hours later from the start of operation) and upon passage of 8000 hours of the operating time. By introducing the diffused layer and the corrosion-resistant film, it was possible to reduce the change in the output voltage with time.

TABLE 5

| Island-like conductive film | Metal separator | Corrosion-resistant film | Output (W) | |
| --- | --- | --- | --- | --- |
| | | | Initial stage | 8000 hours later |
| TiN | SUS316 | $Cr_2O_3$ | 1100 | 1010 |
| | Ti | $TiO_2$ | 1080 | 1000 |
| ZrN | SUS316 | $Cr_2O_3$ | 1150 | 1090 |
| Au | SUS316 | $Cr_2O_3$ | 1180 | 1110 |
| Pt | SUS316 | $Cr_2O_3$ | 1170 | 1100 |
| TiAlN | SUS316 | $Cr_2O_3$ | 1020 | 950 |
| | Al | $Al_2O_3$ | 1000 | 930 |

EXAMPLE 3

Figure 8:
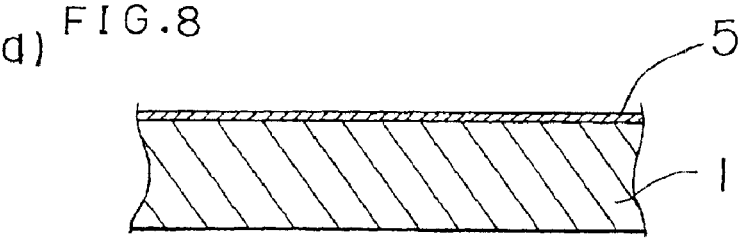
FIG. 8 is a cross sectional view showing the process of surface-treating a metal substrate according to still another example of the present invention.
Figure 8:
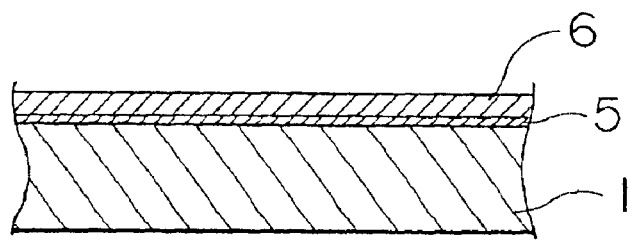

An intermediate layer 5 with a thickness of 0.01 to 0.05 µm was formed on the substrate 1 of the separator plate by rf-magnetron sputtering (a in FIG. 8), and then a conductive film 6 was formed in the same manner as in Examples 1 and 2 (b in FIG. 8). The conditions for forming the intermediate layer 5 are shown in Table 6. The metal substrate used here was stainless steel SUS316. The purpose of forming the intermediate layer was to improve the adhesion between the metal substrate and the conductive film and also to prevent pinholes. The intermediate layer was made of a thin film of a metal element constituting the conductive film. In other words, Ti was formed as the intermediate layer for a Tin-based conductive film, while Zr was formed as the intermediate layer for a ZrN conductive film.

TABLE 6

| Initial layer material | Target | Film thickness (µm) |
| --- | --- | --- |
| Ti | Ti | 0.05 |
| Zr | Zr | 0.05 |
| Ta | Ta | 0.05 |
| W | W | 0.05 |
| Cr | Cr | 0.05 |

Film Forming Conditions

Substrate temperature: Non-heating to 200° C.,

Ar 20 sccm, Plasma power: 200 W,

Film forming time: 2 to 5 min.

Fuel cells similar to those of Example 1 were assembled using the conductive metal separator plates on which the intermediate layers and conductive films were formed as described above, and the continues power generation tests were carried out under the same conditions as in Example 1. Table 7 shows the cell outputs at the initial stage (10 hours later from the start of operation) and upon passage of 8000 hours of the operating time. By introducing the intermediate layer, it was possible to reduce the change in the output voltage with time. Besides, when a diffused layer resulting from diffusion of the metal element of the intermediate layer into the metal substrate was formed by heat-treating each of the conductive metal separator plates having the intermediate layer and conductive film, at a heating temperature of 300° C. for 60 minutes under a vacuum atmosphere (0.1 Pa or less), the outputs after the passage of 8000 hours of the operating time were improved by 10 to 30% from Table 6.

TABLE 7

| Conductive film | Initial layer | Output (W) | |
|---|---|---|---|
| | | Initial stage | 8000 hours later |
| TiN | Ti | 1200 | 1150 |
| ZrN | Zr | 1220 | 1170 |
| TaN | Ta | 1100 | 1020 |
| TiAlN | Ti | 1160 | 1080 |
| | Al | 1130 | 1040 |

EXAMPLE 4

Figure 9:
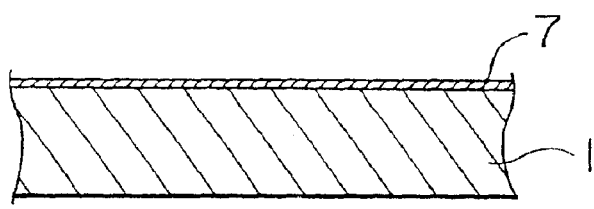
FIG. 9 is a cross sectional view showing the process of surface-treating a metal substrate according to another example of the present invention.
Figure 9:
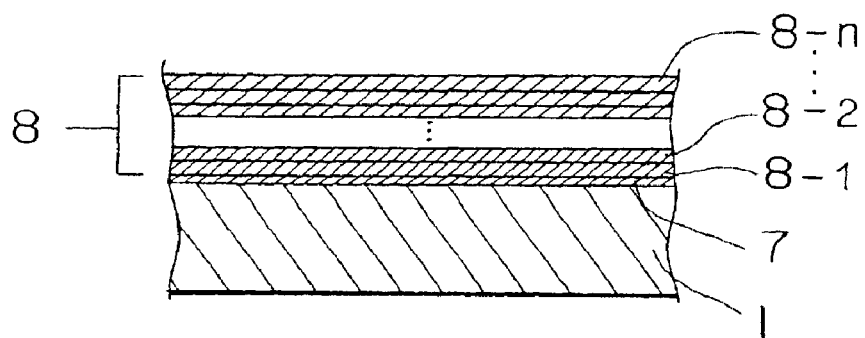

Like Example 3, an intermediate layer 7 with a thickness of 0.01 to 0.05 μm was formed on the metal substrate 1 of the separator plate by rf-magnetron sputtering (a in FIG. 9). Thereafter, n layers of conductive films 8-1, 8-2, . . . , and 8-n were formed on the intermediate layer 7 (b in FIG. 9). The percentage content of the metal atom in each of the conductive films was changed. In other words, the percentage content of the metal atom in the conductive film was decreased from the interface between the conductive film and intermediate layer 7 toward the direction of the surface of the conductive film. No problem will arise even when a structure where the percentage content of the metal atom is decreased continuously is used.

As the method of controlling the percentage content of the metal atom in the conductive film, a method that controls the flow ratio of $N_2$ in a sputtering gas and a method that controls the rf power were used. Table 8 shows the film forming conditions of the method that controls the flow ratio of $N_2$ in the sputtering gas, and Table 9 shows the film forming conditions of the method that controls the rf power. In the method that controls the partial pressure of $N_2$ in the sputtering gas, n=6, i.e., six layers of the conductive films were stacked, while, in the method that controls the rf power, n=4, i.e., four layers of the conductive films were stacked. Note that it is also possible to continuously change the percentage content of the metal atom in the conductive film by continuously changing a film forming parameter, and it is apparent that this is effective for the present invention.

TABLE 8

| Conductive film material | Target | Film thickness of each layer (μm) | $N_2$ flow ratio $N_2/(N_2 + Ar)$ |
|---|---|---|---|
| TiN | Ti | 0.07 | 0, 0.1, 0.2, 0.3, 0.4, 0.5 |
| ZrN | Zr | 0.07 | 0, 0.1, 0.2, 0.3, 0.4, 0.5 |
| TiAlN | Ti + Al | 0.07 | 0, 0.1, 0.2, 0.3, 0.4, 0.5 |
| TiZrN | Ti + Zr | 0.07 | 0, 0.1, 0.2, 0.3, 0.4, 0.5 |
| TaN | Ta | 0.07 | 0, 0.1, 0.2, 0.3, 0.4, 0.5 |
| WN | W | 0.07 | 0, 0.1, 0.2, 0.3, 0.4, 0.5 |
| CrN | Cr | 0.07 | 0, 0.1, 0.2, 0.3, 0.4, 0.5 |

Film Forming Conditions
  Substrate temperature: Non-heating to 300° C.,
  Ar+$N_2$=20 sccm, Plasma power: 200 W,
  Film forming time: 6 min.

TABLE 9

| Conductive film material | Target | Film thickness of each layer (μm) | rf power (W) |
|---|---|---|---|
| TiN | Ti | 0.1 | 50, 100, 200, 300 |
| ZrN | Zr | 0.1 | 50, 100, 200, 300 |
| TiAlN | Ti + Al | 0.1 | 50, 100, 200, 300 |
| TiZrN | Ti + Zr | 0.1 | 50, 100, 200, 300 |
| TaN | Ta | 0.1 | 50, 100, 200, 300 |
| WN | W | 0.1 | 50, 100, 200, 300 |
| CrN | Cr | 0.1 | 50, 100, 200, 300 |

Film Forming Conditions
  Substrate temperature: Non-heating to 300° C.,
  Ar/$N_2$=18/2 sccm, Film forming time: 8 min.

The purposes of introducing an inclination in the percentage content of the metal element in the conductive film were to improve the adhesion between the metal separator and the conductive film, relax the residual stress on the film, and prevent pinholes. As a result, the stability of the outputs of the fuel cells was significantly improved. As the intermediate layer, a thin film of a metal element constituting the conductive film was used. In other words, Ti was formed as the intermediate layer for a TiN-based conductive film, while Zr was formed as the intermediate layer for a ZrN-based conductive film.

Like Example 1, fuel cells were assembled using the conductive metal separator plates, each of which had the intermediate layer and an inclination in the percentage content of the metal element in the conductive film, and the continues power generation test was carried out under the same conditions as in Example 1. Table 10 shows the cell outputs at the initial stage (10 hours later from the start of operation) and upon passage of 8000 hours of the operating time. With the structure where the intermediate layer was introduced and an inclination was provided in the percentage content of the metal element in the conductive film, it was possible to reduce the change in the output voltage with time. Besides, when a diffused layer resulting from diffusion of the metal element of the intermediate layer into the metal substrate was formed by heat-treating each of the conductive metal separator plates having the intermediate layer and conductive film at a heating temperature of 300° C. for 60 minutes under a vacuum atmosphere (0.1 Pa or less), the outputs after the passage of 8000 hours of the operating time were improved by 10 to 30% from Table 10.

TABLE 10

| | | | Output (W) | |
|---|---|---|---|---|
| Initial layer | Conductive film | Control method | Initial stage | 8000 hours later |
| Ti | TiN | $N_2$ flow ratio | 1150 | 1100 |
| | | rf power | 1120 | 1050 |
| Zr | ZrN | $N_2$ flow ratio | 1200 | 1160 |
| | | rf power | 1180 | 1130 |
| Ti | TiAlN | $N_2$ flow ratio | 1110 | 1060 |
| | | rf power | 1090 | 1020 |
| Al | TiAlN | $N_2$ flow ratio | 1090 | 1040 |
| | | rf power | 1070 | 1000 |

EXAMPLE 5

Three kinds of conductive separator plates were fabricated in the same manner as in Example 1, except that stainless steel SUS316L was used as the substrate and conductive films composed of TiN, TiAlN, and TiC, respectively, were formed. The conditions for forming these conductive films were as follows. TiN, TiAlN and TiC were used as the targets, and 1 μm-, 1.2 μm- and 1 μm-thick films were formed by rf-sputtering at the film forming rates of 1.5 μm/hour, 1.0 μm/hour and 1.5 μm/hour, the substrate temperatures of 500° C., 300° C. and 500° C. and the sputtering power of 400 W, 300 W and 400 W, respectively, under an argon atmosphere of $4\times10^{-2}$ Torr.

Meanwhile, the electrodes were fabricated as follows. First, a 400 μm thick carbon nonwoven fabric was impregnated with an aqueous dispersion of a fluorocarbon resin and heat-treated at 400° C. for 30 minutes so as to impart water repellency. A platinum catalyst was carried on a carbon powder in a ratio of 1:1 by weight, and a slurry of the resultant was applied to one surface of the carbon nonwoven fabric so as to form a catalyst layer. Fuel cells, each of which was made of a stack of 50 cells, were assembled in the same manner as in Example 1 except for the above-mentioned conditions. Then, their outputs at the initial stage and upon passage of 8000 hours of the operating time were examined under the same conditions as in Example 1. Table 11 shows the results. The lowering of the outputs were significantly limited though the results were not so superior as compared to the results shown in Table 4. When a film that is composed only of an interstitial compound is to be formed on the metal substrate, its appropriate thickness is within a range of 120 angstrom to 1 μm.

TABLE 11

| Conductive film | Output (W) | |
| --- | --- | --- |
| | Initial stage | 8000 hours later |
| TiN | 1220 | 1150 |
| TiAlN | 1180 | 1050 |
| TiC | 1050 | 980 |

Industrial Applicability

As described above, in accordance with the present invention, in place of a conventional carbon plate cutting method, it is possible to use a metal material, such as stainless steel, as a separator plate without cutting, thereby achieving a significant reduction in the cost in mass production. Moreover, the separator plate can be made thinner, thereby contributing to the realization of a more compact cell stack. Furthermore, since the corrosion resistance of the metal substrate is improved by forming an intermediate layer between the metal substrate of the separator plate and the conductive film, it is possible to improve the output stability of the fuel cell during long-time operation.

What is claimed is:

1. A polymer electrolyte fuel cell comprising:
   a polymer electrolyte membrane;
   an anode and a cathode sandwiching said polymer electrolyte membrane therebetween;
   an anode-side conductive separator plate having a gas channel for supplying a fuel gas to said anode; and
   a cathode-side conductive separator plate having a gas channel for supplying an oxidant gas to said cathode,
   wherein each of said anode-side and cathode-side conductive separator plates comprises a metal plate, an oxidation-resistant conductive film covering partially or entirely a surface of said metal plate facing said anode or cathode, and a diffused layer resulting from diffusion of a material of said conductive film at an interface between said metal plate and conductive film, and
   said conductive film comprises a nitride or carbide of an element selected from the group consisting of Ti, Cr, Zr, Al, Ta and W, or a noble metal.

2. The polymer electrolyte fuel cell as set forth in claim 1,
   wherein said anode-side conductive separator plate comprises a metal plate having grooves or ribs for guiding the fuel gas on its surface facing said anode, and an insulating sheet that forms a gas channel for guiding the fuel gas from a fluid inlet opening of a supply side to a fluid outlet opening of a discharge side on the surface of said metal plate in cooperation with said grooves or ribs, and that has elasticity to function as a gasket for preventing the fuel gas from leaking out of said gas channel, and
   said cathode-side conductive separator plate comprises a metal plate having grooves or ribs for guiding the oxidant gas on its surface facing said cathode, and an insulating sheet that forms a gas channel for guiding the oxidant gas from a fluid inlet opening of a supply side to a fluid outlet opening of a discharge side on the surface of said metal plate in cooperation with said grooves or ribs, and that has elasticity to function as a gasket for preventing the oxidant gas from leaking out of said gas channel.

3. A polymer electrolyte fuel cell comprising:
   a polymer electrolyte membrane;
   an anode and a cathode sandwiching said polymer electrolyte membrane therebetween;
   an anode-side conductive separator plate having a gas channel for supplying a fuel gas to said anode; and
   a cathode-side conductive separator plate having a gas channel for supplying an oxidant gas to said cathode,
   wherein each of said anode-side and cathode-side conductive separator plates comprises a metal plate, an oxidation-resistant conductive film covering partially or entirely a surface of said metal plate facing said anode or cathode, and a diffused layer resulting from diffusion of a material of said conductive film at an interface between said metal plate and conductive film, and
   said conductive film comprises a nitride or carbide of an element selected from the group consisting of Ti, Cr, Zr, Al, Ta and W, or a noble metal,
   wherein said surface of said metal plate facing said anode or cathode is coated with said conductive film in an island pattern, and a corrosion-resistant film is formed in a portion of said metal plate where said conductive film is not formed.

4. The polymer electrolyte fuel cell as set forth in claim 3,
   wherein said anode-side conductive separator plate comprises a metal plate having grooves or ribs for guiding the fuel gas on its surface facing said anode, and an insulating sheet that forms a gas channel for guiding the fuel gas from a fluid inlet opening of a supply side to a fluid outlet opening of a discharge side on the surface of said metal plate in cooperation with said grooves or ribs, and that has elasticity to function as a gasket for preventing the fuel gas from leaking out of said gas channel, and
   said cathode-side conductive separator plate comprises a metal plate having grooves or ribs for guiding the oxidant gas on its surface facing said cathode, and an insulating sheet that forms a gas channel for guiding the oxidant gas from a fluid inlet opening of a supply side to a fluid outlet opening of a discharge side on the surface of said metal plate in cooperation with said grooves or ribs, and that has elasticity to function as a gasket for preventing the oxidant gas from leaking out of said gas channel.

5. A polymer electrolyte fuel cell comprising:

a polymer electrolyte membrane;

an anode and a cathode sandwiching said polymer electrolyte membrane therebetween;

an anode-side conductive separator plate having a gas channel for supplying a fuel gas to said anode; and a cathode-side conductive separator plate having a gas channel for supplying an oxidant gas to said cathode, wherein each of said anode-side and cathode-side conductive separator plates comprises a metal plate, an oxidation-resistant conductive compound film covering a surface of said metal plate facing said anode or cathode, and an intermediate layer composed of a metal element constituting said conductive compound at an interface between said metal plate and conductive compound film.

6. The polymer electrolyte fuel cell as set forth in claim 5, wherein said conductive compound is composed of an interstitial compound.

7. The polymer electrolyte fuel cell as set forth in claim 5, wherein said conductive compound film has a change in a component ratio of an element constituting said conductive compound film from an interface between said conductive compound film and said intermediate layer toward a surface of said conductive compound film.

8. The polymer electrolyte fuel cell as set forth in claim 5, comprising a diffused layer resulting from diffusion of a metal element of said intermediate layer, at an interface between said intermediate layer and metal plate.

9. The polymer electrolyte fuel cell as set forth in claim 5, wherein said anode-side conductive separator plate comprises a metal plate having grooves or ribs for guiding the fuel gas on its surface facing said anode, and an insulating sheet that forms a gas channel for guiding the fuel gas from a fluid inlet opening of a supply side to a fluid outlet opening of a discharge side on the surface of said metal plate in cooperation with said grooves or ribs, and that has elasticity to function as a gasket for preventing the fuel gas from leaking out of said gas channel, and said cathode-side conductive separator plate comprises a metal plate having grooves or ribs for guiding the oxidant gas on its surface facing said cathode, and an insulating sheet that forms a gas channel for guiding the oxidant gas from a fluid inlet opening of a supply side to a fluid outlet opening of a discharge side on the surface of said metal plate in cooperation with said grooves or ribs, and that has elasticity to function as a gasket for preventing the oxidant gas from leaking out of said gas channel.

10. A polymer electrolyte fuel cell comprising:

a polymer electrolyte membrane;

an anode and a cathode sandwiching said polymer electrolyte membrane therebetween;

an anode-side conductive separator plate having a gas channel for supplying a fuel gas to said anode; and a cathode-side conductive separator plate having a gas channel for supplying an oxidant gas to said cathode, wherein each of said anode-side and cathode-side conductive separator plates comprises a metal plate, an oxidation-resistant conductive compound film covering a surface of said metal plate facing said anode or cathode, and an intermediate layer composed of a metal element constituting said conductive compound at an interface between said metal plate and conductive compound film, wherein said surface of said metal plate facing said anode or cathode is coated with said conductive compound film in an island pattern, and a corrosion-resistant film is formed in a portion of said metal plate where said conductive compound film is not formed.

11. The polymer electrolyte fuel cell as set forth in claim 10, wherein said anode-side conductive separator plate comprises a metal plate having grooves or ribs for guiding the fuel gas on its surface facing said anode, and an insulating sheet that forms a gas channel for guiding the fuel gas from a fluid inlet opening of a supply side to a fluid outlet opening of a discharge side on the surface of said metal plate in cooperation with said grooves or ribs, and that has elasticity to function as a gasket for preventing the fuel gas from leaking out of said gas channel, and said cathode-side conductive separator plate comprises a metal plate having grooves or ribs for guiding the oxidant gas on its surface facing said cathode, and an insulating sheet that forms a gas channel for guiding the oxidant gas from a fluid inlet opening of a supply side to a fluid outlet opening of a discharge side on the surface of said metal plate in cooperation with said grooves or ribs, and that has elasticity to function as a gasket for preventing the oxidant gas from leaking out of said gas channel.

* * * * *